2 Sheets—Sheet 1.

E. NORTON.

DIES FOR MAKING BLANKS FOR STOVE-PIPE ELBOWS.

No. 7,049. Reissued April 11, 1876.

Witnesses
Charles L. Parrish
Franklin Parrish

Inventor
Edwin Norton
by atty
Charles L. Parrish

N. PETERS, PHOTO-LITHOGRAPHER, WASHINGTON, D. C.

E. NORTON.

DIES FOR MAKING BLANKS FOR STOVE-PIPE ELBOWS.

No. 7,049. Reissued April 11, 1876.

Witnesses
Charles L. Parrish
Franklin Parrish

Inventor
Edwin Norton
by atty
Charles L. Parrish

N. PETERS, PHOTO-LITHOGRAPHER, WASHINGTON, D. C.

UNITED STATES PATENT OFFICE.

EDWIN NORTON, OF CHICAGO, ILLINOIS.

IMPROVEMENT IN DIES FOR MAKING BLANKS FOR STOVE-PIPE ELBOWS.

Specification forming part of Letters Patent No. 121,807, dated December 12, 1871; reissue No. 7,049, dated April 11, 1876; application filed March 10, 1874.

*To all whom it may concern:*

Be it known that I, EDWIN NORTON, of Chicago, Cook county, State of Illinois, have invented certain new and useful Improvements in Dies for Cutting Sheet-Metal Blanks for Curved Elbows for Stove-Pipes and other purposes; and I do hereby declare the following to be a full description of the same, reference being had to the accompanying drawings, forming a part of this specification, the same letters of reference, wherever they occur, referring to like parts.

Figure 1:
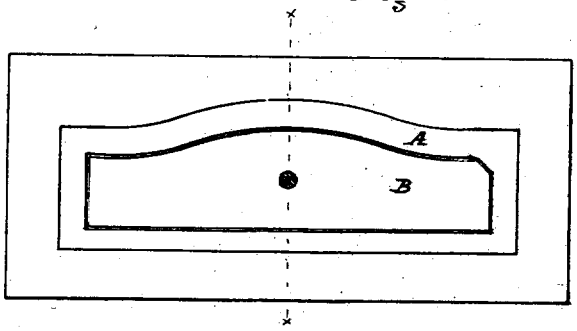
Figure 2:
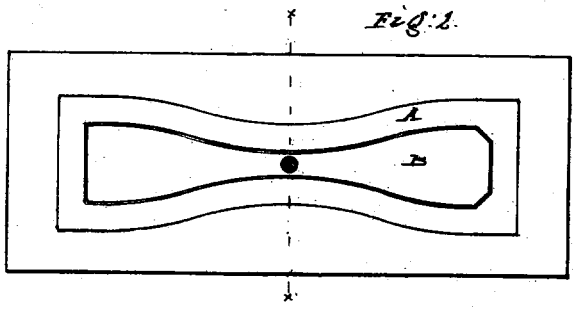
Figure 3:
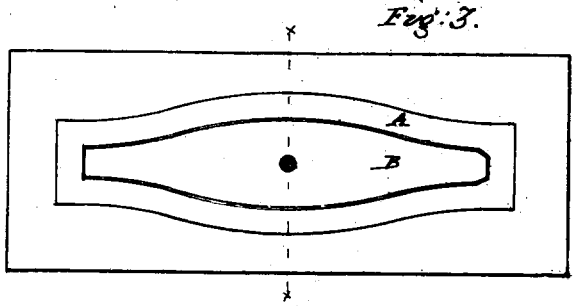
Figure 4:
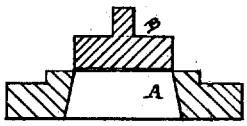
Figure 5:
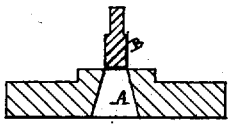
Figure 6:
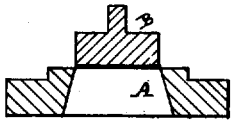
Figure 7:
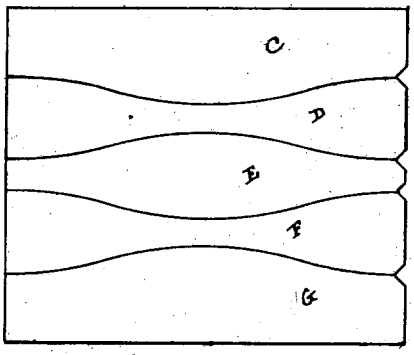
Figure 8:
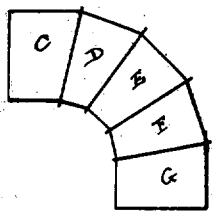

Figures 1, 2, and 3, Sheet 1, are plan views of the dies. Figs. 4, 5, and 6, Sheet 2, are cut sectional views of the dies through the line *x x*, Figs. 1, 2, and 3, showing the punch in the position when commencing to cut the blank. Fig. 7, Sheet 2, represents a square of metal as divided by the dies. Fig. 8, Sheet 2, is a representation of the curved elbow.

Letter A represents the matrix or base of the dies, and B the punches or cutting-tools. These dies are made of steel, and have their faces or cutting-edges hardened, so as to cut the blanks of metal from the sheet quickly, and at the same time with clean and smooth edges.

The dies for cutting the necessary blanks to form the elbow may be composed of three dependent dies, according to the curvature desired to be given to the elbow—that is, cut and shape the several blanks of metal, so as to form a curved elbow, and at the same time with great dispatch.

In the die, Fig. 1, Sheet 1, is cut the blank C, Figs. 7, 8, Sheet 2. In the die, Fig. 2, Sheet 1, is cut the blank D, Figs. 7, 8, Sheet 2.

The machinery and presses for operating the dies being common and well known, I do not deem it necessary to give a particular description of them.

Having now described my invention I will set forth what I claim, and desire to secure by Letters Patent of the United States, premising, however, that I do not claim the new article of manufacture of blanks for square stove-pipe elbows, as that is claimed in my patent of April 27, 1869; but

What I do claim is—

A series of dies having curved cutting-faces, for cutting blanks of metal to form curved elbows for stove-pipe and other purposes, substantially as described.

EDWIN NORTON.

Witnesses:

CHARLES L. BARRITT,

GRIFFEN B. HALSTED.